3,052,722
AMINOPHENOXYALKANE DERIVATIVES
Julius Nicholson Ashley, Upminster, Raymond Frederick Collins, Harold Wood, and Michael Davis, Upminster, England, assignors to May & Baker Limited, Dagenham, Essex, England, a British company
No Drawing. Filed June 15, 1959, Ser. No. 820,092
Claims priority, application Great Britain June 24, 1958
5 Claims. (Cl. 260—575)

This invention relates to organic compounds, and has for an object the provision of new organic compounds which have useful therapeutic activity. Further objects are to provide useful processes for the preparation of, and pharmaceutical compositions containing, such compounds.

According to an aspect of the present invention, there are provided new and useful organic compounds of the general formula:

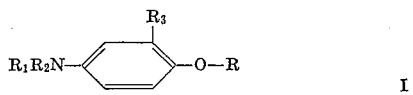

I where $R_1$ and $R_2$ are the same or different and represent hydrogen atoms, lower alkyl, lower hydroxyalkyl (including polyhydroxyalkyl) or lower alkoxy-alkyl groups, $R_3$ represents a lower alkyl or alkoxy group and R represents a straight or branched chain, saturated or unsaturated aliphatic hydrocarbon group containing 3 to 12 carbon atoms or a said hydrocarbon group containing one or more primary or tertiary hydroxy or acyloxy substituents. The word "lower" is applied in this specification to organic groups containing from 1 to 4 carbon atoms.

The aforesaid new compounds possess useful therapeutic activity being especially useful in the treatment of worm infections such as bilharziasis and fascioliasis (particularly liver fluke in sheep and cattle). Of importance for the treatment of bilharziasis are the alkyl ethers in which R represents an n-hexyl, n-heptyl, n-octyl, or n-decyl group. Compounds particularly preferred for the treatment of bilharziasis are 1-(4-amino-2-methoxyphenoxy)-n-heptane and 1-(4-amino-2-methoxyphenoxy)-n-octane and their acid addition salts.

The compounds of Formula I may be employed in the form of acid addition salts and such salts are included within the scope of the invention. It is, of course, necessary, when acid addition salts are employed, that the anion of the acid should be relatively innocuous to the animal organism in useful doses of the salts so that the beneficial physiological properties in the bases are not vitiated by side-effects ascribable to the anions; in other words, only non-toxic salts are contemplated. Suitable acid addition salts include hydrohalides (for example, hydrochlorides), phosphates, nitrates, sulphates, maleates, fumarates, citrates, tartrates, methane sulphonates and ethane disulphonates. These salts may be made from the bases of general Formula I by the methods heretofore used in the art for making acid addition salts. For example, the acid addition salts may be made by mixing the required base with an equivalent quantity of a non-toxic acid in a solvent and isolating the resultant salt by filtration after, if necessary, evaporation of part or all of the solvent. They may be purified by crystallisation or by any other method commonly used in the art.

According to a feature of the invention, compounds of Formula I are prepared by a process which comprises reacting a compound of the formula:

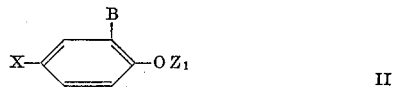

II with a compound of the formula $Z_2Y$, where X is the group $R_1R_2N$ or a group convertible thereto, B is the group $R_3$ or a group convertible thereto, e.g. a hydroxy group or a protected hydroxy group such as methoxymethoxy or benzyloxy, $Z_1$ is a hydrogen atom or an alkali metal ion, $Z_2$ is a residue of a reactive ester, e.g. a halogen atom or a residue of an organic sulphonic ester, and Y is the group R or a group convertible thereto, for example an alkenyl group containing 3 to 12 carbon atoms. Groups X which are convertible as aforesaid are, for example: groups convertible to a primary amino group, e.g. acylamido, nitro, carbonamido, alkoxycarbonylamido and arylazo groups; groups convertible to a secondary amino group, e.g., acylalkylamino (by hydrolysis) and acylamido groups (by reduction); and groups convertible to a tertiary amino group, e.g. quaternary ammonium groups (by pyrolysis) and acylalkylamino groups (by reduction).

In addition, compounds of the invention containing primary or secondary amino groups $R_1R_2N$ may be converted to secondary or tertiary amino compounds of the invention by methods known per se, e.g. a compound containing a primary amino group may be condensed with an aldehyde or ketone and the resulting product reduced to give a product containing a secondary amino group.

The following examples will serve to illustrate the invention.

*Example 1* n-Decyl bromide (22.1 g.) was refluxed with potassium 2-methoxy-4-nitrophenoxide (20.7 g.) in 2-ethoxyethanol (50 ml.) for 3 hours, cooled and filtered. The solid was washed with water and crystallised from ethanol to give 1-(2-methoxy-4-nitrophenoxy)-n-decane, M.P. 50° C., which was reduced catalytically to 1-(4-amino-2-methoxyphenoxy)-n-decane, M.P. 61–62° C.

Similarly prepared were: 1-(2-methoxy-4-nitrophenoxy)-n-heptane, M.P. 53–55° C. and 1-(4-amino-2-methoxyphenoxy)-n-heptane, M.P. 72–74° C.; 1-(2-methoxy-4-nitrophenoxy)-n-propane, M.P. 70.5–71.5° C. (Olivero, Gazzetta, 1943, 73, 181 gives M.P. 72° C.) and 1-(4-amino-2-methoxyphenoxy)-n-propane, M.P. 65–67° C.; 1-(2-methoxy-4-nitrophenoxy)-n-butane, M.P. 56–58° C. (Olivero, loc. cit., gives M.P. 56° C.) and 1-(4-amino-2-methoxyphenoxy)-n-butane, M.P. 35–36° C. (the methanesulphonate had M.P. 173–175° C.); 1-(2-methoxy-4-nitrophenoxy)-n-pentane, M.P. 55–56.5° C. and 1-(4-amino-2-methoxyphenoxy)-n-pentane, M.P. 43–44° C. (the methanesulphonate had M.P. 185–200° C.); 1-(2-methoxy-4-nitrophenoxy)-n-hexane, M.P. 69.5–70.5° C. and 1-(4-amino-2-methoxyphenoxy)-n-hexane, M.P. 67–69° C. (the hydrochloride had M.P. 185–200° C.); 1-(2-methoxy-4-nitrophenoxy)-n-octane, M.P. 33–34° C. and 1-(4-amino-2-methoxyphenoxy)-n-octane, M.P. 62–64° C.; 1-(2-methoxy-4-nitrophenoxy)-n-nonane, an oil, and 1-(4-amino-2-methoxyphenox)-n-nonane, M.P. 71–73° C.; 1-(2-methoxy-4-nitrophenoxy)-n-undecane, M.P. 49.5–50.5° C. and 1-(4-amino-2-methoxyphenoxy)-n-undecane, M.P. 67° C.; 1-(2-methoxy-4-nitrophenoxy)-n-dodecane, M.P. 51–52.5° C. and 1-(4-amino-2-methoxyphenoxy)-n-dodecane, M.P. 65–66° C.; 2-(2-methoxy-4-nitrophenoxy)-n-octane, M.P. 42–43° C. and 2-(4-amino-2-methoxyphenoxy)-n-octane, B.P. 143–146° C./0.05 mm. (the hydrochloride had M.P. 160–180° C.); 1-(2-methoxy-4-nitrophenoxy)-3,5,5-trimethyl-n-hexane, an oil, and 1-(4-amino-2-methoxyphenoxy)3,5,5-trimethyl-n-hexane, M.P. 72–73.5° C.; 1-(2-methoxy-4-nitrophenoxy)-2-ethyl-n-hexane (43% yield), B.P. 164–184° C./0.02 mm., and 1-(4-amino-2-methoxyphenoxy)-2-ethyl-n-hexane, a liquid, isolated as the hydrochloride (55% yield), M.P. 160–164° C.; 1-(2-methoxy-4-nitrophenoxy)-2-ethyl-n-butane (53% yield), B.P. 150–170° C./0.05 mm., and 1-(4-amino-2-methoxyphenoxy)-2-ethyl-n-butane, a liquid, isolated as the hydrobromide (69% yield), M.P. 214–217° C.; 1-(2-methoxy-4-nitrophenoxy)-3,7-dimethyl-n-octane (29% yield), B.P. 204–215° C./0.3 mm., and 1-(4-amino-2-methoxyphenoxy)-3,7-dimethyl-n-octane, a liquid, isolated as the hydrochloride (58.6% yield), M.P. 158–164° C.; 2-(2-methoxy-4-nitrophenoxy)-n-nonane (19.1% yield), B.P. 186–194° C./0.8 mm., and 2-(4-amino-2-methoxyphenoxy)-n-nonane (49% yield), B.P. 160–170° C./0.2 mm. (the hydrochloride had M.P. 164–168° C.).

*Example II*

Toluene-p-sulphonylchloride (23.2 g.) was added at below 25° C. to a solution of 1-hydroxy-n-pent-4-ene (9.5 g.) in dry pyridine (50 ml.). After 2 hours, the mixture was poured into ice-water, acidified and extracted with ether. The ether extract was evaporated and the residue was refluxed for 24 hours with potassium 2-methoxy-4-nitrophenoxide (22.9 g.) in 2-ethoxyethanol (300 ml.). The cooled mixture was diluted with water and the product was filtered off and recrystallised from aqueous ethanol, giving 1-(2-methoxy-4-nitrophenoxy)-n-pent-4-ene, M.P. 65–66° C. Reduction of this nitro compound (15 g.) with sodium sulphide nonahydrate (45 g.) in aqueous ethanol afforded 1-(4-amino-2-methoxyphenoxy)-n-pent-4-ene, M.P. 25–26° C.

Similarly prepared were 1-(2-methoxy-4-nitrophenoxy)-n-hept-3-ene (yield 36%), B.P. 164–168° C./0.1 mm., and 1-(4-amino-2-methoxyphenoxy)-n-hept-3-ene (41.5% yield), M.P. 38–42° C.

*Example III*

2-methyl-4-nitrophenol (8.1 g.) was added to a solution of sodium ethoxide [sodium (1.22 g.) dissolved in dry ethanol (150 ml.)] and the solution was treated with n-octyl bromide (10.2 g.), refluxed for 18 hours, and diluted with water. The cooled mixture was extracted with ether. The ethereal solution was washed with water, 2 N sodium hydroxide, and water again, dried and concentrated. Some light petroleum (B.P. 40–60° C.) was added and the pure 1-(2-methyl-4-nitrophenoxy)-n-octane (6.75 g.), M.P. 37–38° C., crystallised out on cooling the solution of −80° C. Catalytic reduction of this product in ethanol over Raney nickel catalyst gave 1-(4-amino-2-methylphenoxy)-n-octane, a liquid, isolated as the methanesulphonate (81% yield), M.P. 177–178.5 C.

*Example IV*

4-aminoguaiacol (53.8 g.) was dissolved in a solution of sodium hydrogen carbonate (131 g.) in water (193 ml.) and treated with dimethyl sulphate (131 ml.). The mixture was stirred for 18 hours at room temperature (the temperature was controlled at 20–25° C. during the first two hours by ice-water cooling). Excess potassium iodide was added to the filtered solution and the crystalline precipitate was collected. It was recrystallised from water to give the pure 4-hydroxy-3-methoxyphenyl trimethyl ammonium iodide (83 g.), M.P. 208–211° C. (decomp.). The foregoing compound (30.9 g.) in ethanol (100 ml.), sodium carbonate (10.6 g.) and n-octyl bromide (19.3 g.) were refluxed together for 20 hours. The cold mixture was diluted with ether and the solid precipitate was collected, washed with ether, and dissolved in boiling water (200 ml.) and the pH was adjusted to about 6 with 2 N acetic acid. Excess of sodium iodide was added and the solution cooled. The crystalline 1-(4-dimethylamino-2-methoxyphenoxy)-n-octane methiodide (28.15 g.), M.P. 184–185° C. (decomp.), was collected and washed with a little water and dried. This quaternary iodide (27.15 g.) was heated carefully under reduced pressure (at the water-pump) until methyl iodide ceased to be evolved. The liquid product was cooled, extracted with ether, filtered and concentrated. The residue of 1-(4-dimethylamino-2-methoxyphenoxy)-n-octane, a liquid, was converted into the hydrobromide (18.7 g.), M.P. 119–120° C. (crystallized from ethanol-ether).

*Example V*

1-(4-amino-2-methoxyphenoxy)-n-octane (25.1 g.) in ethanol (50 ml.), ethyl iodide (50 ml.) and sodium carbonate (10.6 g.) were refluxed together for 22 hours. The solvent was removed and the residue was pyrolysed as in Example IV until ethyl iodide ceased to be evolved. The crude base was dissolved in ether, filtered, concentrated and the residue was distilled to give 1-(4-diethylamino-2-methoxyphenoxy)-n-octane (26.0 g.), B.P. 162–174° C./0.05 mm.

*Example VI*

1-(4-amino-2-methoxyphenoxy)-n-octane (25.1 g.) in concentrated hydrochloric acid (9.2 ml.) was treated with formamide (45 g.) and refluxed for 1.5 hours. The excess formamide was removed in vacuo and the residue was poured into cold water. The product solidified and was filtered off and recrystallised from ethanol to give the pure 1-(4-formamido-2-methoxyphenoxy)-n-octane (22.5 g.), M.P. 77–78° C. This compound (22 g.), dissolved in the minimum of an ether-benzene mixture, was added dropwise to a stirred suspension of lithium aluminium hydride (3.4 g.) in ether (150 ml.). The mixture was refluxed for 3 hours, cooled, treated carefully with wet ether (to decompose the excess of lithium aluminium hydride) and 2 N sodium hydroxide, filtered, and the ether-benzene layer was separated. It was washed with a small quantity of water, dried, and concentrated and the residue was distilled to give 1-(2-methoxy-4-methylaminophenoxy)-n-octane (14.5 g.), B.P. 161–163° C./0.2 mm., $n^{22°}=1.592$, the hydrochloride of which had M.P. 107–108.5° C.

*Example VII*

1-(4-amino-2-methoxyphenoxy)-n-octane (25.1 g.) was suspended in water (180 ml.) and acetic acid (6 ml.) and treated with 2-chloroethylchloroformate (11.4 ml.) and sodium acetate (8.2 g.). The mixture was stirred for 1.5 hours, filtered and the residue was washed with water and recrystallised from ethanol to give the required 1-[4-(2-chloroethoxycarbonylamino) - 2 - methoxyphenoxy] - n-octane (37 g.), M.P. 72.5–74° C. The foregoing compound (36.5 g.) in a mixture of 2-ethoxyethanol (100 ml.) and ethanol (100 ml.) was treated with sodium hydroxide (24 g.) in water (46 ml.) and refluxed for ten minutes, cooled, diluted with water and the product taken up in chloroform. The extract was dried, concentrated and the residue taken up in light-petroleum (B.P. 40–60 °C.). The solution was cooled to −80° C. and the pure 1-[4-(2-hydroxyethyl)amino-2-methoxyphenoxy]-n-octane (22 g.), M.P. 35–36.5° C., was collected.

*Example VIII*

1-(4-amino-2-methoxyphenoxy)-n-octane (25.1 g.) and calcium carbonate (25 g.) were suspended in water and treated with 2-chloroethanol (25 ml.) and the mixture was refluxed for 18 hours. The cold mixture was extracted with chloroform, filtered, concentrated and the residue was distilled to give 1-[4-di(2-hydroxyethyl)amino-2-methoxyphenoxyl]-n-octane (16 g.), B.P. 225° C./0.3 mm., M.P. 63–65° C. (after crystallisation from ether).

The present invention further includes within its scope pharmaceutical compositions which comprise one or more compounds of general Formula I or their acid addition salts as aforesaid together with a significant amount of a pharmaceutical carrier. The invention includes especially such compositions made up for oral or parenteral administration. In clinical practice the compounds of the present invention will normally be administered orally so that compositions suitable for oral administration are preferred.

Solid compositions for oral administration include compressed tablets, pills, dispersible powders, and granules. In such solid compositions one or more of the active compounds of the invention is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention, for oral administration, also include capsules of absorbable material such as gelatin containing one or more of the active substances of the invention with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage shall be obtained. Obviously several unit dosage forms may be administered at about the same time.

The following example illustrates pharmaceutical compositions according to the invention.

*Example IX*

Tablets are prepared of the formula:

|  | Percent |
|---|---|
| 1-(4-amino-2-methoxyphenoxy)-n-heptane | 78.4 |
| Sodium carboxymethylcellulose | 0.88 |
| Starch | 14.2 |
| Dextrin | 5.5 |
| Magnesium stearate | 0.44 |
| Stearic acid | 0.6 | the percentages being by weight.

Similarly may be prepared pharmaceutical compositions in the form of tablets in which for the active amino compound there is replaced a like quantity of the product of, e.g., any one of Examples I to VIII.

We claim:

1. A member of the class consisting of the amines of the general formula:

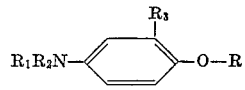

and their acid addition salts formed with non-toxic acids where $R_1$ and $R_2$ are selected from the class consisting of hydrogen atoms, lower alkyl, lower hydroxyalkyl, and lower alkoxyalkyl groups, $R_3$ is selected from the class consisting of lower alkyl and alkoxy groups, and R is an aliphatic wholly hydrocarbon group containing 6 through 10 carbon atoms.

2. The compound 1-(4-amino-2-methoxyphenoxy)-n-heptane.

3. The compound 1-(4-amino-2-methoxyphenoxy)-n-octane.

4. An acid addition salt of 1-(4-amino-2-methoxyphenoxy)-n-heptane formed with a non-toxic acid.

5. An acid addition salt of 1-(4-amino-2-methoxyphenoxy)-n-octane formed with a non-toxic acid.

References Cited in the file of this patent
UNITED STATES PATENTS

| 2,027,178 | Knight | Jan. 7, 1936 |
| 2,908,677 | Straley et al. | Oct. 13, 1959 |
| 2,913,495 | Goldsmith | Nov. 17, 1959 |